United States Patent [19]

Cameron

[11] Patent Number: 4,469,087

[45] Date of Patent: Sep. 4, 1984

[54] SOLAR HEATING DEVICE

[76] Inventor: A. W. W. Cameron, 5 Vanellan Ct., Toronto, Ontario, Canada, M8Z 4A5

[21] Appl. No.: 475,598

[22] Filed: Mar. 15, 1983

[51] Int. Cl.³ .............................................. F24B 7/00
[52] U.S. Cl. .................................. 126/422; 126/429; 126/430; 165/48 S
[58] Field of Search ............... 126/429, 431, 422, 430, 126/436, 445, 449; 165/48 S, 49

[56] References Cited

U.S. PATENT DOCUMENTS

| | | | |
|---|---|---|---|
| 246,626 | 9/1881 | Morse | 126/429 |
| 4,002,159 | 1/1977 | Angilletta | 126/429 X |
| 4,058,109 | 11/1977 | Gramm | 165/40 X |
| 4,068,652 | 1/1978 | Worthington | 126/431 X |
| 4,072,141 | 2/1978 | Fillios et al. | 98/31 |
| 4,212,292 | 7/1980 | Reinert | 126/449 |
| 4,237,865 | 12/1980 | Lorenz | 126/429 |
| 4,257,396 | 3/1981 | Reinert | 126/426 |
| 4,301,787 | 11/1981 | Rice | 126/429 |
| 4,327,795 | 5/1982 | Wheeler | 126/429 X |
| 4,379,449 | 4/1983 | Wiggins et al. | 126/429 X |

FOREIGN PATENT DOCUMENTS

| | | | |
|---|---|---|---|
| 2509023 | 1/1983 | France | 126/429 |
| 77640 | 6/1981 | Japan | 126/429 |

Primary Examiner—Randall L. Green
Attorney, Agent, or Firm—Ridout & Maybee

[57] ABSTRACT

A device for utilizing solar energy to heat air comprises an insulating body spaced from preferably a masonry wall of a building and a solar collector positioned in front of the insulating body. Circulation means are provided for removing heated air from the device while promoting circulation of air in the device around the insulating body.

15 Claims, 4 Drawing Figures

SOLAR HEATING DEVICE

The present invention relates to a device for utilizing solar energy to heat air for use in heating a building. Preferably the present device is installed on an exterior masonry wall of a building which is provided with ducts so that the air heated by the device can be introduced into the building and cooler air from within the building can be returned to the device for heating.

There are a number of devices presently known or proposed for providing solar heating to a building. Most known devices rely wholly or partly on convection caused by the collection of solar energy to circulate air within the device or into and out of the building. It has been found that reliance solely on convection for air circulation results in pockets of stagnant air being formed within the device thus greatly lowering its overall efficiency.

The present invention provides a device which efficiently collects solar heat energy and transfers it to air circulating in the device. When the device is installed on a masonry exterior wall of a building, that is, a wall made of brick, stone, concrete, cider block or the like; or on a wall containing other material having good heat storage properties, part of the heat in the air circulating through the device is transferred to the wall and part is transferred directly into the building.

The heat stored by the masonry wall in this manner extends the heating effect of the device by continuing to provide heat into the building for a period after solar collection ceases. The device is provided with a panel of insulation to retard heat loss to the atmosphere through the building wall during cold periods, and conversely, to retard heat penetration into the building through the exterior wall during hot weather periods.

To ensure efficient circulation of air within and through the device, means, preferably comprising a fan, are provided at a duct connecting the device to the interior of the building. During periods when sufficient solar heat is being collected, the fan is actuated either automatically or manually causing air to move along the solar collector, along the exterior wall and into the building.

While it is conceivable that the present device may be relied on as the sole or main source of heating for the building, it is generally thought that in most temperate climates the device will constitute a significant supplementary source of heat for the building enabling the owner to reduce his reliance on conventional, and increasingly more expensive, heating means. The present device is designed to offer a highly efficient source of heat for a modest investment.

Accordingly, the present invention provides a device for utilizing solar energy to heat air comprising, a frame having two side members attached to a top and a bottom member, and a rear wall, which is the exterior wall of a building, attached to the periphery of the frame. An insulating body is spaced from the rear wall and is snugly attached within the frame to the two side members. The insulating body is also spaced from the top and bottom frame members. Means for collecting solar energy, preferably comprising a conductive metal sheet having a dark matt finish, is positioned in front of and spaced from the insulating body as well as being spaced from the top and bottom frame members. A substantially transparent front wall is spaced in front of the solar collecting means and is attached to the periphery of the frame. Circulation means is provided for introducing unheated air into the device and for removing heated air from the device while promoting the circulation of air in the device around the insulating body.

A preferred embodiment of the invention will be described hereafter with reference to the drawings in which.

Figure 1:
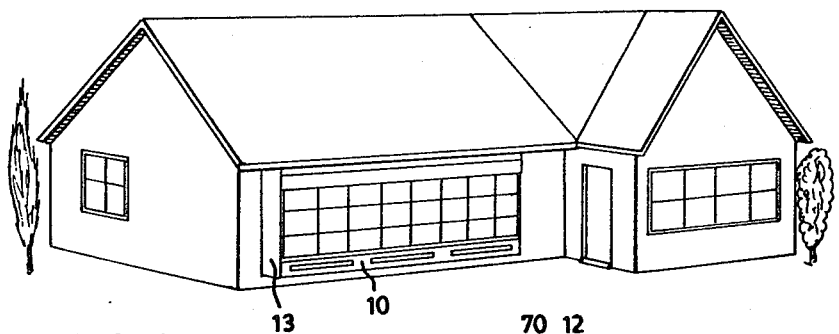
FIG. 1 is a perspective view of the device showing several adjacent panels installed on an exterior wall of a building.

Referring to FIG. 1, one or more panels of the solar collection device 10 of the present invention may be attached to an exterior wall of a building which receives substantial sunlight on clear days during the heating season. To the casual observer, the device 10 appears to be ordinary windows. Thus, the devices 10 may be arranged on the building in a manner which does not detract from its outward appearance. The devices 10 may be interspersed between and styled to match existing windows or arranged to suggest a bow window or other such manner.

Figure 2:
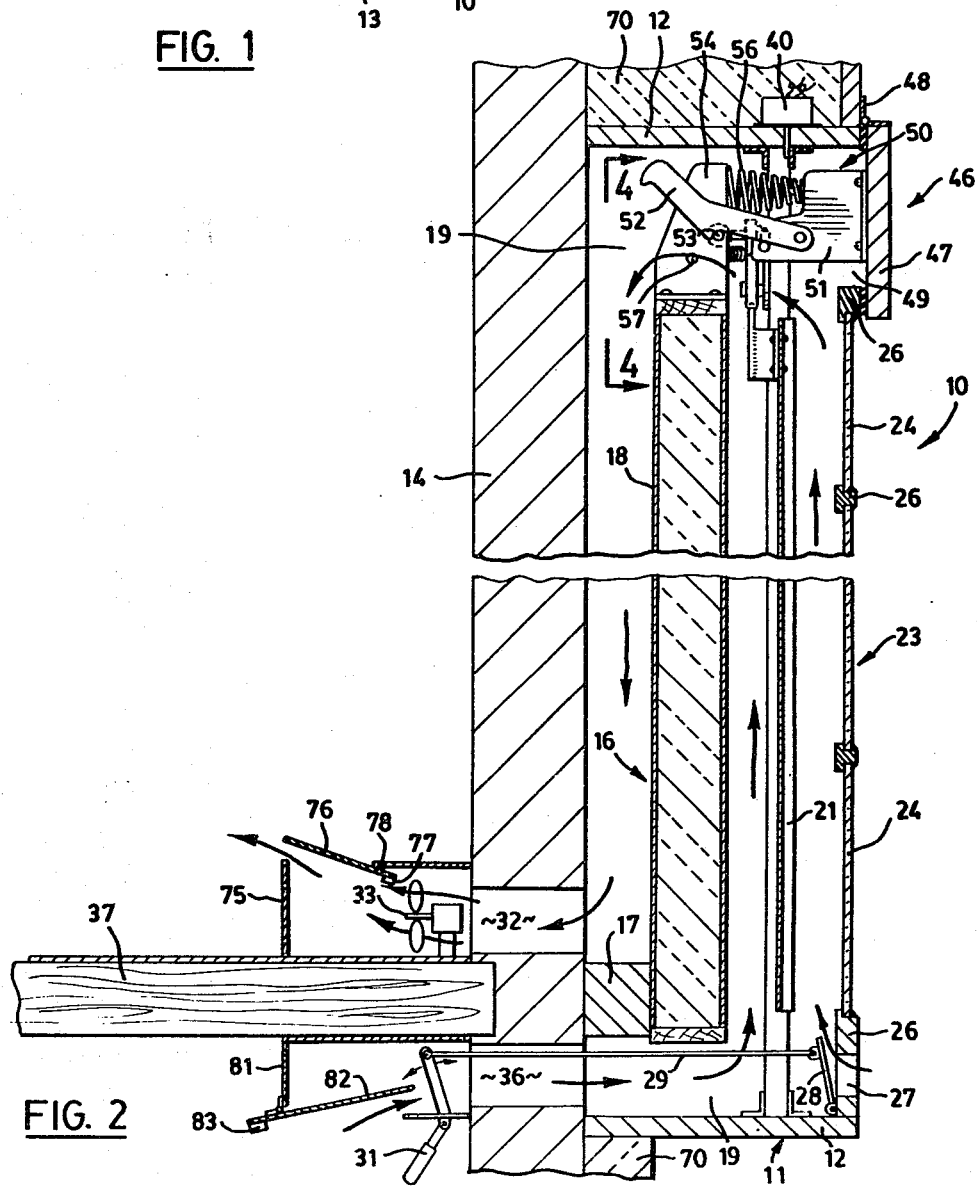
FIG. 2 is an enlarged cross-sectional view of a panel of the device shown in FIG. 1, showing the automatic vent means in the closed position.

The construction of the preferred device 10 as installed may be appreciated by referring to FIG. 2. The device 10 comprises a frame 11 having top and bottom members 12 and side members 13 (see FIG. 1) which is attached to an exterior wall 14 of a building. While it is not essential, it is preferred that the frame 11 be attached to a masonry wall 14 of a building, that is a wall made of brick, stone, concrete, cinder block or the like. The wall 14 then provides a rear wall for the device 10.

An insulating body 16 is spaced from the rear wall 14 of the device 10 by a solid spacer 17 which in the embodiment shown is attached near the bottom along the entire width of the body 16. The insulating body 16 comprises a casing 18 which is snugly attached to the inner surfaces of the side members 13. The height of the casing 18 is less than that of the frame 11 and the casing 18 is positioned within the device 10 so as to leave spaces 19 between it and the top and bottom members 12. The casing 18 contains an insulating material such as fiber glass, and the function of the casing 18 is to position the insulation and to isolate it from the air moving through the device. This latter feature is important when a fibrous material is used as the insulation.

Spaced in front of the insulating body 16 is a solar collector 21. The collector 21 is preferably a thin metal sheet, such as steel, which has a dark matt finish applied to its outer surface for absorbing the solar energy. The collector 21 in the form of a metal sheet is secured to the side members 13 in a manner to allow for thermal expansion. The dimensions of the collector 21 approximate the horizontal and vertical dimensions of the insulating body 16, and like the body 16, the collector 21 is spaced from the top and bottom members 12. Preferably, the sheet metal collector 21 is provided with vertical corrugations to give the collector 21 added stiffness and rigidity, and to provide more effective surface area at slightly varied angles for collection of solar energy.

A front wall 23 of the device 10 is spaced from the collector 21, and it is substantially transparent to allow solar energy access to the collector 21. Preferably the front wall 23 comprises panes of glass 24 set in a frame 26. The glass 24 may be ordinary window glass being just sufficiently thick to provide reasonable structural strength, but not so thick as to absorb appreciable solar energy.

Preferably, the device 10 is provided with an inlet in the lower portion thereof for the introduction of fresh air. As shown in FIG. 2, an inlet 27 is provided at the bottom of the front wall 23. The amount of air entering through the inlet 27 is controlled by a door 28 which may be remotely operated by means of a rod 29 and lever 31.

In order to bring heated air into the building, the rear wall 14 is provided with a duct 32 just above the spacer 17. Ideally the device is situated on the wall 14 so that the duct 32 can be located near the bottom of a wall in the building. In case of a building equipped with forced air heating, the duct 32 can be connected to the appropriate ductwork of the central heating system to provide supplementary heat to the building generally rather than just directly to the room adjacent to the attachment of the device 10.

The device 10 is constructed so that air can be circulated upwardly along the collector 21 and downwardly along the wall 14 before entering the building through the duct 32. This circulation must be assisted by a fan 33 located so as to move air through the duct 32 into the building (see arrows in FIG. 2). Without the assistance of the fan 33 or similar means, air heated by the collector 21 may merely rise to the top of the device 10 creating a bubble of hot air. The fan assisted circulation of air within the device 10 prevents the formation of such hot air bubbles or pockets, and thus, the solar energy collected by the device 10 is efficiently utilized.

As shown in FIG. 2, air from within the building can be recirculated through the device 10 by providing an additional duct 36 in the wall 14 just below the spacer 17. In order to derive the greatest benefit from recirculation of the air within the building, the device 10 may be situated so that the spacer 17 is at the level of a floor 37 of the building. Thus, the device 10 so positioned on the wall 14 then spans two storeys of the building and can accept air from the lower floor through the duct 36 for circulation through the device 10 and introduction into the upper floor through the duct 32. If desired, the recirculated air may be mixed with outside fresh air by opening the inlet 27 at the same time air is being drawn in through the duct 36. Clearly, there are a number of ways one can arrange the ducts 32 and 36 for the purpose of circulating air through the device 10. Also, the fan 33 may draw air through the duct 32 as shown, or may be positioned to blow air through the duct 36. The ducts 32 and 36 may be partitioned from one another in several ways depending on their locations. The important design criterion is to position the various elements to ensure the proper flow of air through the duct 36, the device 10 and the duct 32. While circulation is shown in FIG. 2 as including rooms on adjacent storeys, the circulation can be on one storey including adjacent rooms or merely one room.

When several panels of the device 10 are installed on a wall, either as shown in FIG. 1 or spaced from one another on the wall, it is usually desirable to provide manifold ducts from panel to panel for the purpose of joining the air inlets and the air outlets of the panels to the appropriate ducts 32 and 36 through the wall 14. Thus, in this manner one set of ducts 32 and 36 through the wall 14 can be used for a group of panels rather than requiring wall piercing ducts 32 and 36 for each panel. Clearly, the panels of the device 10 shown in FIG. 2 are modified structurally as required to effect the proper air circulation when such panels are used in the groups. Thus, in a device 10 having an air circulation pattern as shown in FIG. 2, the connected panels of the device 10 will have an insulating body 18 extending to the bottom member 12 thereby eliminating the bottom space 19. Also, the spacer 17 is not needed in the connected panels.

The foregoing discussion has related to basic features of the present invention, and it should be appreciated at this point that the device 10 may be constructed of readily available and inexpensive materials. For example, without limiting the scope of the present invention, the device 10 may comprise a frame 11 made of 1×6 wooden boards, a casing 18 made of 1×4 wooden boards and thin cellulose board sheets, and a collector 21 made of 0.7 mm thick sheet steel painted matt black on the outward facing side thereof. The insulating body 16 may be spaced from the wall 14 by a spacer 17 comprising a 1×1 wooden board. Ordinary fiber glass may be used for the insulating body 16 and ordinary window glass set in a simple frame of wood, metal or plastic may be utilized for the front wall 23.

In addition to such basic features of the device 10 described above, the preferred embodiment shown in the drawings has several additional features which may be added as described or in a modified form for the purpose of automating its operation.

Since the efficient operation of the device 10 requires the use of the fan 33 to move the air heated in the device 10 into the building, it is quite useful to have an automatic means for activating the fan 33 at appropriate times. To this end, a thermostat 40 is attached to the top member 12 having a temperature sensing probe 41 inserted through an aperture 42 in the member 12 into the space 19 at the top of the device 10. The thermostat 40 is connected to the fan 33 which then will be activated only when the air in the upper space 19 is sufficiently hot.

Figure 3:
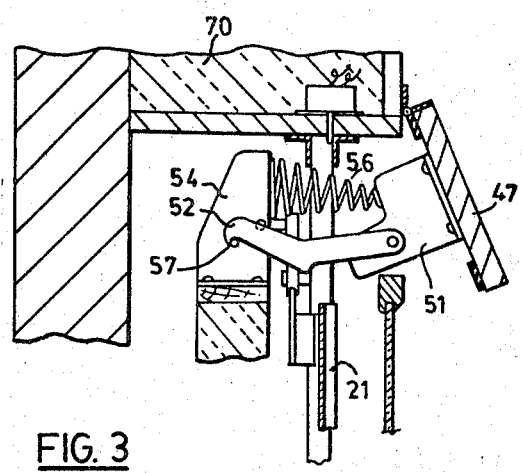
FIG. 3 is a partial cross-sectional view of the device shown in FIG. 2, showing the automatic vent means in the open position.

If, for any reason, the device 10 becomes overheated, it is desirable to provide a hatch 46 at the top of the device 10 to vent hot air into the atmosphere. A very simple design for a vent hatch 46 may comprise a slot in the top member 12 covered by a door which may be pivoted on hinges. A hatch of this type may be operated manually when venting is desired. However, it is clearly desirable to provide an automatic venting means to insure that extreme heat is avoided, and such an automatic mechanism is shown in FIGS. 2, 3 and 4.

Referring first to FIG. 2, a hatch 46 for venting hot air from the device 10 is located at the top of the front wall 23. A door 47 is pivotally attached at the top of the frame 11 by hinges 48, and the door 47 covers a slot-shaped aperture 49 defined by the frame 26 and top member 12. The aperture 49 need not run the entire width of the front wall 23, but should be of sufficient size to allow hot air to quickly escape when the door 47 is open.

Located centrally of the rear side of the door 47 is an automatic latch means 50. The latch means 50 comprises a bracket 51 affixed to the rear side of the door 47 to which is pivotally attached a latch 52. The latch 52 secures the door 47 closed by engaging a latch pin 53 slidably positioned in a bracket 54 which is affixed to the top of the insulating body 16. A conical compression spring 56 is attached to the brackets 51 and 54, which pushes open the door 47 when the latch pin 53 is withdrawn releasing the latch 52 (see FIG. 3). In the embodiment shown, the travel of the latch 52 is restricted by a stop pin 57 in the bracket 54 which is engaged by the latch 52 when the door 47 is open.

Figure 4:
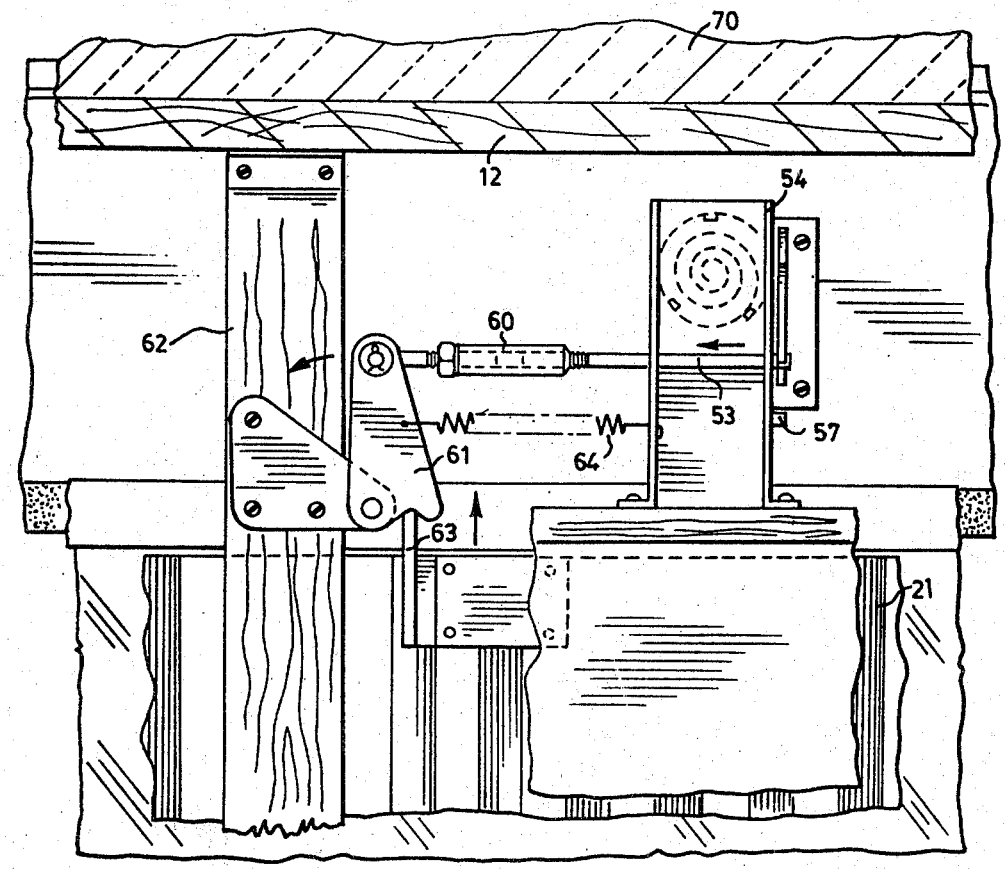
FIG. 4 is a plan view partially cut away and enlarged taken along arrows 4—4 in FIG. 2 showing details of the automatic vent means.

The withdrawal of the latch pin 53 is automatically controlled by means cooperating with the thermal expansion of the collector 21 as may best be appreciated by referring to FIG. 4. The latch pin 53 is pivotally attached through a turn-buckle 60 to a swing bracket 61 mounted on a wooden post 62 attached to top and bottom members 12. A pin 63 is mounted on the collector 21, and the pin 63 engages the swing bracket 61 at its lower end.

Thermal expansion of the collector 21 causes the pin 63 to move upwardly rotating the swing bracket 61 so as to withdraw the latch pin 53. The amount of expansion of the collector 21 needed to cause the latch 52 to be sprung can be regulated by adjusting the turnbuckle 60. A spring 64 is provided between the swing bracket 61 and the bracket 54 to cause the swing bracket 61 to be biased against the pin 63, thereby providing automatic return of the latch pin 53 for relatching of the door 47 when the device 10 has cooled sufficiently. Relatching of the door 47 must be done manually.

Additional features of this automatic vent means which will be apparent to the skilled reader but which are not shown in the drawings, include a guide attached to the bracket 54 for the travel of the latch 52.

It will be apparent that efficient operation of the automatic vent means requires the introduction of cool air into the device 10 at the bottom space 19 as hot air is leaving at the top through the hatch 46. This cool air may be supplied through the inlet 27 or the duct 36.

As mentioned above, the present device 10 is intended to efficiently utilize the available solar energy for supplementing the heating requirements of a building in a twofold manner. Primarily, the device 10 supplies solar heat to the building by transferring the heat collected by the collector 21 to air circulating around the collector, which in turn transfers heat to the masonry wall 14 as such air moves downwardly along it and finally, by direct introduction of such heated air into the building through the duct 32. Secondary heating for the building is provided when the heat so stored in the wall 14 is gradually released into the building. Even when the temperature of the wall 14 falls below that of the interior of the building, the temperature gradient across the wall 14 will continue to retard heat loss from within the building for a considerable time. Heat is lost only slowly from the wall to the external environs because of the insulating effect of the body 16. Ideally, the benefit of thermal storage provided by the wall 14 is enhanced by the installation of additional insulation 70 around device 10. Because masonry is a good conductor of heat, the loss of heat to the atmosphere from the spreading effect of the heat transferred to the wall 14 will be greatly reduced by the use of the additional insulation 70.

From the foregoing description, it will be apparent to the skilled reader that there may be a number of variants of the device 10 which include the basic principles of the present invention. There may be a number of automatic accessories added to the basic device 10 in addition to those already mentioned, but it is felt that generally such additional accessories should be few and simple to be cost justified.

A simple automatic accessory which is felt to be cost justified is illustrated in FIG. 2. Ducts 32 and 36 in the wall 14 may be easily equipped with automatic hatches. A box 75 having a damper 76 balanced if necessary with a counterweight 77 about a hinge 78 is provided to enclose the duct 32 and the fan 33. In a similar manner, the duct 36 in the wall 14 is equipped with a box 81 having a damper 82 and if necessary a counterweight 83. Activation of the fan 33 causes air to be drawn out of the device 10 thereby increasing the air pressure in the box 75 relative to that of the room outside the box 75. This causes the damper 76 to open. At the same time the damper 82 of the box 81 opens because the fan 33 has caused the air pressure within the box 81 to be reduced relative to that of the room outside the box 81.

By incorporation of the automatic accessories heretofore described, normal daily operation of the device 10 requires no attention. Appropriate air flow is established when solar energy received becomes sufficient to produce the desired temperatures. Upon diminution of solar energy received below the level producing the desired temperatures, air circulation is stopped, and there is substantially no undesirable air movement from the device 10 into the building, or within the device 10.

In actual operation of the device 10, the various elements described may be arranged relative to one another in accordance with the effect desired. To maximize utilization of the available solar energy reaching the collector 21 for heating the building, experimentation has indicated that assuming a frame 11 made from 6 inch lumber, the insulating body should be spaced from the wall 14 by about 2 cm. The collector 21 should be 1 to 2 cm from the body 16 and preferably 2 cm from the glass 24 of the front wall 23. If the collector 21 is positioned too close to the glass 24, there is a significant loss of heat from the collector 21 through the glass 24.

The temperature of the air entering the building from the device 10 can be altered by adjusting the amount of fresh air introduced through the inlet 27 and by controlling the amount of heat transferred to the wall 14. Heat transferred to the wall 14 can be reduced by increasing the speed of air flowing down the wall 14, or by adding a reflective coating such as aluminum foil to a portion of the wall 14 facing the body 16.

The preferred embodiment illustrated in FIG. 2 shows a circulation pattern upwardly along the collector 21 then downwardly along the wall 14, or more generally, initially along the collector 21 followed by circulation along the wall 14. This air flow pattern transfers the greatest proportion of collected heat into the wall 14. It should be understood that the present invention also includes a device 10 wherein the air circulation pattern is the reverse of that previously described. Thus, in the device 10 shown in FIG. 2, the flow of air may proceed initially upwardly along the wall 14 and then downwardly along the collectors 21 (clearly, the fan 33 must be repositioned). For automatic operation in this reverse circulation mode, a thermostat 40 must be positioned to monitor the air temperature in the lower space.

Using the device 10 in the reverse circulation mode, the wall 14 will be heated by air coming from the interior of the building, and the utilization of collected solar heat will be directly employed for supplying heated air to the interior of the building. By taking advantage of these alternative air circulation patterns, the optimum balance of heat to wall and heat to building air can be achieved especially where several panels of the device 10 are installed on a wall 14 and are interconnected by manifolds as described above. Thus, some panels can have the upward air flow along the collector 21 and others can have the reverse air flow.

When the wall 14 is so cold that it absorbs all or nearly all the usable heat obtained by air from the collector 21 which is circulated in the manner shown in FIG. 2, it may be desirable to equip the device 10 with means for effecting recirculation of air within until the desired air temperature is reached at the duct 32. Such recirculation means will be apparent to the reader skilled in the art, but, by way of example, appropriate recirculation means could comprise a duct connecting the boxes 75 and 81 having a hatch which is automatically opened or closed by a thermostat positioned at the duct 32 in conjunction with appropriate mechanical means. In such a system the operation of the fan 33 would be governed by the thermostat at the duct 32 as well as by the thermostat 40.

In the summer or at other times when heat from the device 10 is not desired, the dampers 76 and 82 can remain closed and the fan 33 turned off, while at the same time opening the fresh air inlet 27 and the vent door 47. Because the angle of the sun is higher, during summer, the collector 21 will not receive as much direct solar energy as in winter, and the foregoing procedure should avoid any serious overheating. Also, the collector 21 may be used as an air pump during the summer by introducing air from the building through the duct 36 which will be evacuated through the open vent 46 by thermal convection.

Of course, the collector 21 can be deactivated during the summer by the use of shutters or awnings or by providing a reflective material in front of its dark matt surface. In this regard, use might be made of a solar collector which comprises a slat blind or venetian blind design. Each slat of a collector of this type would be rotatable about its longitudinal axis, with one side of each slat having a dark matt finish and the other side being reflective. With this arrangement, the collector could be easily activated or deactivated as desired.

It will be appreciated by the skilled reader that the device of the present invention may be installed to accommodate a variety of needs. For example, while it is felt that the most economical installation of the device 10 is as described, that is, vertically flush against an exterior masonry wall 14, a sloping installation may be advantageous in some cases, or the arrangement of several panels of the device 10 in a bow window configuration may be used to collect solar energy at varying angles as the bearing of the sun changes. These and other variants are intended to be included within the scope of the present invention as defined in th following claims.

I claim:

1. A device for utilizing solar energy to heat air comprising:
    a frame having two side members attached to a top and a bottom member;
    a rear wall, which is an exterior wall of a building, attached to the periphery of the frame, the wall being made of material having good heat storage properties;
    an insulating body spaced from the rear wall and from the top and bottom members of the frame, being snugly attached within the frame to the two side members;
    a solid spacer extending across the device from one side member to the other and engaging the rear wall and insulating body;
    means for collecting solar energy positioned in front of and spaced from the insulating body, said solar collecting means also being spaced from the top and bottom members;
    a front wall spaced in front of the solar collecting means and attached to the periphery of the frame, said front wall being substantially transparent to allow solar energy access to the solar collecting means; and
    circulation means for introducing unheated air into the device and for removing heated air from the device while promoting the circulation of air in the device around the insulating body so that the unheated air moves initially along the solar collecting means and then as heated air moves along the rear wall thereby delivering a portion of the derived heat to the wall.

2. A device as claimed in claim 1, wherein the exterior wall of a building is made of masonry.

3. A device as claimed in claim 2, wherein masonry comprises brick, stone, concrete or cinder block.

4. A device as claimed in claim 1, wherein the insulating body comprises fiber glass.

5. A device as claimed in claim 1, wherein the means for collecting solar energy comprises a thin metal sheet having a dark matt coating on the side thereof facing the front wall.

6. A device as claimed in claim 5, wherein the metal sheet is of steel having vertical corrugations.

7. A device as claimed in claim 1, wherein the front wall comprises at least one pane of glass.

8. A device as claimed in claim 1, wherein the circulation means comprises a fresh air inlet duct in the device, an outlet duct in the rear wall, and a fan positioned near the exit of the outlet duct to draw heated air from the device into the building and to promote circulation of air within the device.

9. A device as claimed in claim 1, wherein the circulation means comprises an inlet duct and an outlet duct in the rear wall, a partition between said ducts so that air flowing through the inlet duct from the building passes around the insulating body and into the building through the outlet duct, and a fan positioned near one of the ducts to promote circulation of air within the device.

10. A device as claimed in claim 9, wherein the rear wall spans two storeys of a building so that air from one storey passes through the outlet duct into the other storey.

11. A device as claimed in claim 9 wherein the circulation means, further comprises a fresh air inlet duct for allowing outside air to flow into the device.

12. A device as claimed in claim 10, wherein the circulation means further comprises a fresh air inlet duct for allowing outside air to flow into the device.

13. A device as claimed in claim 1, further comprising vent means located above the solar collecting means for venting hot air to the atmosphere in order to prevent overheating of the device.

14. A device as claimed in claim 13, further comprising a thermally activated latch means for operating the vent means, said latch means comprising a spring biasing the vent means open, a latch for holding the vent means closed against the force of said spring, a slidably positionable latch pin for the latch, and means for retracting the latch pin from engagement with the latch when the temperature in the device reaches a threshhold level.

15. A device as claimed in claim 1, further comprising a thermostat positioned near the top thereof for activating the circulation means when the air in the vicinity of the thermostat reaches a threshhold level.

* * * * *